(12) United States Patent
Yu et al.

(10) Patent No.: US 8,154,822 B1
(45) Date of Patent: Apr. 10, 2012

(54) ANALOG TECHNIQUES TO DECODE SIGNALS EXTRACTED FROM COMPUTER-READABLE STORAGE MEDIA

(75) Inventors: Zaihe Yu, Santa Clara, CA (US); Zining Wu, Los Altos, CA (US); Michael Madden, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 57 days.

(21) Appl. No.: 12/554,787

(22) Filed: Sep. 4, 2009

Related U.S. Application Data

(60) Provisional application No. 61/095,127, filed on Sep. 8, 2008.

(51) Int. Cl.
*G11B 5/596* (2006.01)

(52) U.S. Cl. ........... 360/77.04; 360/32; 360/48; 360/51; 360/75; 360/77.02; 360/78.04

(58) Field of Classification Search .......................... None
See application file for complete search history.

(56) References Cited

U.S. PATENT DOCUMENTS

| | | | | |
|---|---|---|---|---|
| 5,585,976 A | * | 12/1996 | Pham | 360/77.04 |
| 6,141,175 A | * | 10/2000 | Nazarian et al. | 360/77.04 |
| 6,707,635 B1 | * | 3/2004 | Codilian et al. | 360/77.04 |
| 6,768,607 B2 | * | 7/2004 | Ottesen et al. | 360/77.02 |
| 6,912,099 B2 | * | 6/2005 | Annampedu et al. | 360/39 |
| 6,924,959 B1 | * | 8/2005 | Melkote et al. | 360/77.04 |
| 7,199,956 B1 | * | 4/2007 | Moser et al. | 360/46 |
| 7,602,568 B1 | * | 10/2009 | Katchmart | 360/51 |
| 7,826,168 B2 | * | 11/2010 | Takaishi | 360/77.04 |
| 7,982,990 B1 | * | 7/2011 | Yu et al. | 360/39 |
| 2003/0184908 A1 | * | 10/2003 | Hsin | 360/77.04 |
| 2005/0068650 A1 | * | 3/2005 | Annampedu et al. | 360/39 |

* cited by examiner

*Primary Examiner* — Dismery Mercedes

(57) ABSTRACT

Methods, apparatuses, and systems implementing analog techniques to decode signals extracted from servo wedges of computer-readable storage media. A digital signal representing a repeatable runout (RRO) signal included in an analog signal of a computer-readable storage medium is obtained. The RRO signal includes a preamble that represents a magnitude of the RRO signal, and data. The digital signal includes a digital representation of the preamble. An estimate of the magnitude of the RRO signal is determined based on the digital representation. The estimate is compared with a specified level to generate an error signal based on a difference between the two. The provision of the error signal, for application to a subsequent RRO signal of the computer-readable storage medium, is delayed. The RRO signal is amplified prior to being represented as the digital signal to match a value established to decode the RRO signal.

20 Claims, 11 Drawing Sheets

ANALOG TECHNIQUES TO DECODE SIGNALS EXTRACTED FROM COMPUTER-READABLE STORAGE MEDIA

CROSS REFERENCE TO RELATED APPLICATIONS

This application claims the benefit of the priority of U.S. Provisional Application Ser. No. 61/095,150, filed Sep. 8, 2008, and entitled "Improve RRO Decoding Performance by Adapting VTB Decoder Gain Target," and of U.S. Provisional Application Ser. No. 61/095,127, filed Sep. 8, 2008, and entitled "Improve RRO Decoding Performance by Adapting VGA Gain." The entire contents of both provisional applications are incorporated herein by reference.

BACKGROUND

Computer-readable storage media are used in computer systems to provide storage for data. For example, hard disk drives, that each include multiple storage disks are used to store large amounts of data. Data encoded on a hard disk drive is stored and retrieved using a read/write transducer or head mounted on an actuator. Using a servo control system, the head is positioned over a disk that is rotated at high RPM (revolutions per minute), and the data is written on and read from the disk. Specifically, the data is encoded in servo wedges on data tracks positioned concentrically on the computer-readable storage disks. Each servo wedge includes a main servo and a repeatable runout (RRO). The main servo includes a Gray Code on which track identification data is encoded. Read-out heads scan servo wedges and can provide analog signals that represent the data encoded on the servo wedges. The analog signals include a main servo signal and an RRO signal representing the main servo and the RRO, respectively.

SUMMARY

The present disclosure includes systems and techniques relating to analog techniques to decode signals extracted from computer-readable media. The described systems and techniques can be implemented in processing circuitry, for example, an FPGA (field programmable gate array) or an ASIC (application specific integrated circuit). The described systems and techniques can also be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, the disclosed embodiment(s) below can be implemented in various systems and apparatus, including, but not limited to, a special purpose data processing apparatus (e.g., a wireless access point, a remote environment monitor, a router, a switch, a computer system component, a medium access unit), a mobile data processing apparatus (e.g., a wireless client, a cellular telephone, a personal digital assistant (PDA), a mobile computer, a digital camera), a general purpose data processing apparatus (e.g., a minicomputer, a server, a mainframe, a supercomputer), or combinations of these. In general, one innovative aspect of the invention can be implemented in a method in which a digital signal representing a repeatable runout (RRO) signal included in an analog signal of a computer-readable storage medium is obtained. The RRO signal includes a preamble that represents a magnitude of the RRO signal, and data. The digital signal includes a digital representation of the preamble. An estimate of the magnitude of the RRO signal is determined based on the digital representation of the preamble. The estimate of the magnitude of the RRO signal and a specified level are compared to generate an error signal based on a difference between the estimate and the specified level. The provision of the generated error signal is delayed for application to a subsequent RRO signal of the computer-readable storage medium. The RRO signal is amplified prior to being represented as the digital signal to match a value established to decode the RRO signal.

This, and other aspects, can include one or more of the following features. Obtaining the digital signal can further include receiving the analog signal from a read-out head configured to read data location information stored on a servo wedge. The RRO signal received from the servo wedge can be amplified. The RRO signal can be converted into the digital signal. Prior to the converting, the RRO signal can be amplified. Determining the estimate can include determining the estimate using Discrete Fourier Transformation (DFT) based on a baud-rate sampling system. Four samples can be extracted from the digital signal. Alternatively, eight samples can be extracted from the digital signal.

Another innovative aspect of the invention can be implemented in an apparatus including an input element, an output element, and processing circuitry coupled with the input element and the output element, and configured to perform operations. In the operations, a digital signal representing a repeatable runout (RRO) signal included in an analog signal of a computer-readable storage medium is obtained. The RRO signal includes a preamble that represents a magnitude of the RRO signal, and data. The digital signal includes a digital representation of the preamble. An estimate of the magnitude of the RRO signal is determined based on the digital representation of the preamble. The estimate of the magnitude of the RRO signal and a specified level are compared to generate an error signal based on a difference between the estimate and the specified level. The provision of the generated error signal is delayed for application to a subsequent RRO signal of the computer-readable storage medium. The RRO signal is amplified prior to be represented as the digital signal to match a value established to decode the RRO signal.

This, and other aspects, can include one or more of the following features. The apparatus can include a decoder configured to decode the digital signal based on a Viterbi algorithm so that a value established to decode the signal matches the amplitude of the RRO signal.

Yet another innovative aspect of the invention can be implemented as a system including a receiver configured to receive multiple analog signals from corresponding multiple servo wedges encoded in a sequence on a data track of a computer-readable medium. Each analog signal includes a corresponding repeatable runout (RRO) signal that includes a preamble signal representing a magnitude of the corresponding RRO signal, and data. The system includes an amplified configured to amplify a RRO signal received from a servo wedge in the sequence to match a value established to decode the RRO signal. A gain of the amplified RRO signal is controlled to match a specified gain that enables matching the value established to decode the RRO signal to extract the data. The system includes an analog front end including an analog to digital converter configured to convert the amplified RRO signal to a digital signal that includes the data. The system also includes a processor configured to determine an estimate of a magnitude of the RRO signal based on sample signals extracted from the digital signal. The estimate is an estimate of the magnitude of the RRO signal. The system also includes a gain controller configured to perform operations including comparing the estimate of the magnitude of the RRO signal and a specified level to generate an error signal based on a difference between the estimate and the specified level, and applying the error signal to control a gain of the amplified RRO signal received from the servo wedge.

This, and other aspects, can include one or more of the following features. The multiple analog signals can include corresponding multiple main servo signals. The receiver can further be configured to receive a main servo signal with the RRO signal. The amplifier can further be configured to amplify the main servo signal. The analog front end can further be configured to convert the amplified main servo signal into a digital main servo signal. The gain controller can further be configured to compare a magnitude of the digital main servo signal and a specified main servo level, and control the amplifier to amplify the main servo signal to the specified main servo level. The system can further include a gain selection unit configured to perform operations including determining a main servo error signal representing a difference between the magnitude of the digital main servo signal and the specified main servo signal, receiving the error signal based on the difference between the estimate and the specified level, determine that a portion of an analog signal being amplified by the amplifier is the RRO signal, and in response to the determining, providing the error signal to the processor to apply the error signal to control the gain of the amplified RRO signal.

The described systems and techniques can cause a read-out head, that reads data position information stored in servo wedges on data tracks of a computer-readable storage medium, to make improved decisions regarding the position of the servo wedges on the data tracks. Specifically, decisions that the read-out head makes based on RRO fields included in data tracks can be improved. Because an estimate of magnitude is provided to a decoder for decoding a digital signal and extracting data included in the digital signal, decoder error can be decreased. Further, because detector gain target for each RRO field is adjusted based on an estimate of the magnitude of the RRO signal, the performance obtained from each RRO signal can be improved. Furthermore, the methods described here negate a need to store detector gain target values, thereby reducing costs associated with storage.

Details of one or more implementations are set forth in the accompanying drawings and the description below. Other features, objects and advantages may be apparent from the description and drawings, and from the claims.

DRAWING DESCRIPTIONS

Like reference symbols in the various drawings indicate like elements.

DETAILED DESCRIPTION

Systems, apparatuses, and techniques for decoding signals obtained from a read-out head configured to read data position information stored on data tracks of a computer-readable storage medium are described. The data position information is stored in servo wedges on the data tracks. An analog signal obtained from a servo wedge on a data track includes a portion of the data position information. The analog signal includes a main servo signal and a repeatable runout (RRO) signal, each of which have respective data. Using techniques to determine the data in the RRO signal, an estimate of an amplitude of the RRO signal is determined and used to decode the analog signal. The systems, apparatuses, and techniques described herein can be implemented as one or more devices, such as one or more integrated circuit (IC) devices (e.g., a wireless communication device, an electronic data storage device, a channel medium access access/control device). For example, the systems and techniques disclosed can be implemented in a wireless local area network (WLAN) transceiver device (e.g., a WLAN chipset) suitable for use in an OFDM MIMO (Orthogonal Frequency Division Multiplexing Multiple-In-Multiple-Out) system. An example of such a system is described with reference to FIG. 1.

Figure 1:
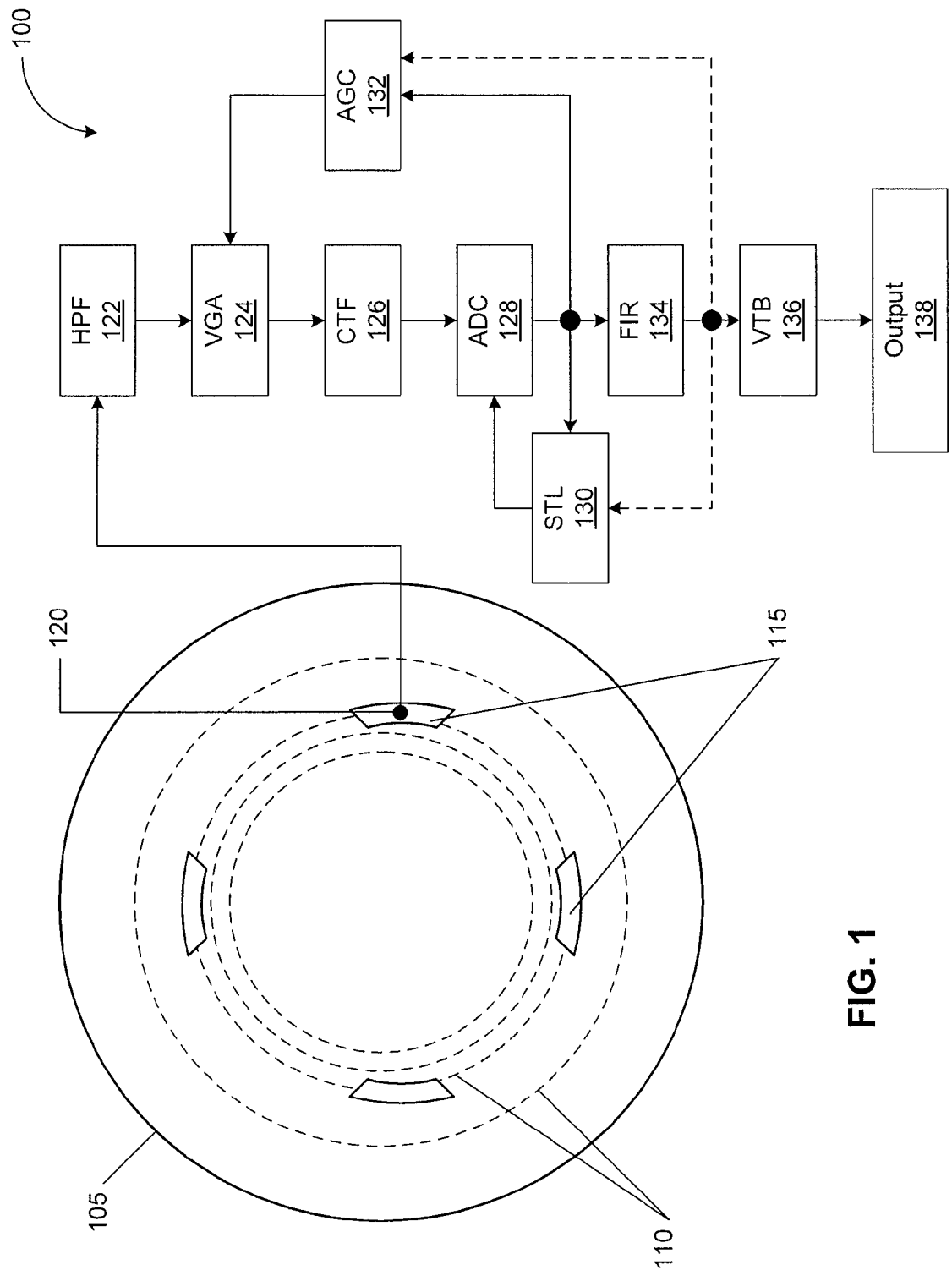
FIG. 1 shows a block diagram showing an example of a system for providing read data position information encoded on a computer-readable storage medium.

FIG. 1 shows a block diagram showing an example of a system 100 for providing read data position information encoded on a computer-readable storage medium. The system 100 includes a computer-readable storage medium 105 including multiple data tracks 110, each of which encodes data representing position information. The data tracks 110 are concentrically located areas defining tracks on a surface of the medium 105. Data is stored on the medium 105, and the data positions, by which the data is written to and read from the medium 105, are encoded in multiple servo wedges 115 that are positioned on each data track 110. The data on a data track 110 can be retrieved by positioning a read-out head 120 over a servo wedge 115. For example, the medium 105 can be a magnetic-storage-media disk in a hard disk drive included in computer systems to provide primary storage for data.

The read-out head 120 reads the data encoded on a servo wedge 115 and provides an analog signal that includes the data. The system 100 includes components configured to extract the data that is included in the analog signal. The components include a high-pass filter (HPF) 122 that receives the analog signal from the read-out head 120 and filters the analog signal. The filtered signal is input to a variable gain amplifier (VGA) 124 that amplifies an amplitude of the analog signal. The amplified signal is further filtered using a continuous-time filter (CTF) 126 prior to being converted into a digital signal using an analog to digital converter (ADC) 128. The digital signal is further filtered using a finite impulse response (FIR) filter 134 and provided as input to a decoder 136, for example, a Viterbi (VTB) decoder. The decoder 136 decodes the digital signal to extract the data that is included in the analog signal and provides the extracted data as an output 138.

As described with reference to FIG. 2, the servo wedge 115 includes a main servo signal and an RRO signal, each of which has a respective amplitude and time period. With reference to figures that follow, techniques are described by which the data encoded in an RRO signal can be determined. A digital technique is described in which a magnitude of the RRO signal is estimated, and a detector gain target of the decoder 136 is adapted in accordance with the estimate so that the output 138 matches the magnitude of the RRO signal. Further, an analog technique is described in which an estimate of the magnitude of the RRO signal is compared with a specified level to generate an error signal based on a difference between the estimate and the specified level, and the RRO signal is amplified in accordance with the error signal to obtain the magnitude of the RRO signal. To implement these techniques, the system 100 can include a processor (described with reference to FIGS. 4 and 5) that estimates the magnitude of the RRO signal, an automatic gain control (AGC) 132 (FIG. 1) configured to control a gain of the amplified analog signal and a servo timing loop (STP) 130 (FIG. 1) configured to adjust a frequency at which the RRO signal is sampled to estimate the RRO signal magnitude.

As a precursor to describing the techniques, basic information about the encoding of data in a servo wedge is described with reference to FIGS. 2 and 3. The contents of a servo wedge and the variations between two servo wedges are described with reference to FIG. 2 and FIG. 3, respectively.

Figure 2:
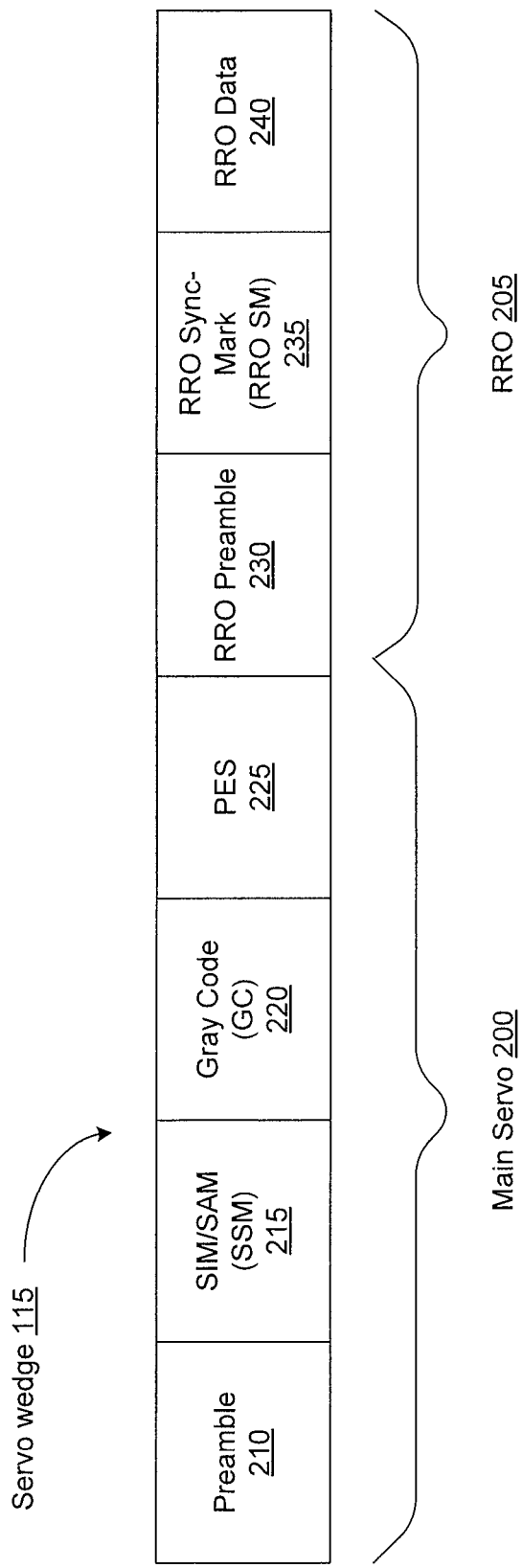
FIG. 2 shows a format of a servo wedge.

FIG. 2 illustrates a format of a servo wedge 115. The servo wedge includes a main servo 200 and an RRO 205. The main servo 200 includes a preamble 210, a Servo Index Mark (SIM)/Servo Address Mark (SAM) (SSM) 215, Gray Code (GC) 220, and Position Error Signal (PES) 225. The RRO 205 includes an RRO preamble 230, an RRO Sync-Mark (RRO SM) 235, and RRO data 240. The preamble 210 of the main servo 200 and the RRO preamble 230 represent magnitudes of the main servo 200 and the RRO 205, respectively. The read-out head 120 writes, i.e., encodes the data, on the servo wedge 115. When the read-out head 120 reads the contents encoded on the servo wedge 115, the head 120 outputs an analog signal including a main servo signal and an RRO signal. As described below, variations in flight height result in variations in amplitudes of data encoded on different wedges on the same data track as well as on different data tracks.

Figure 3:
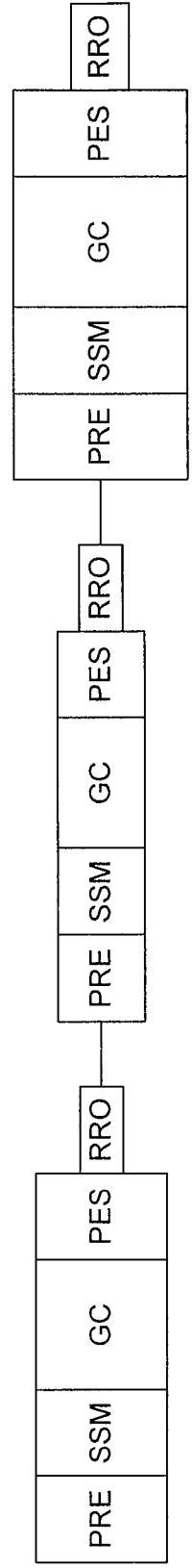
FIG. 3 shows variations among main servo signal amplitudes of multiple servo wedges.

FIG. 3 illustrates variations among main servo signal amplitudes of multiple servo wedges. The data encoded on a servo wedge is used to help the read-out head 120 to identify and adjust read-out head 120 position. When servo wedges 115 are encoded on the computer-readable media 105, the contents of the main servo 200 are encoded first followed by the contents of the RRO 205. The process of encoding data onto and reading data from a data track includes positioning the read-out head 120 at a distance above the computer-readable storage medium 105. This distance, called flight height, is not controlled when the main servo 200 is encoded. Variations in the flight height cause the main servos of different servo wedges to be different, causing the magnitude of the main servo signal obtained from the main servos of different servo wedges also to be different. In contrast, flight height control is established when encoding the RRO of the servo wedge. Consequently, RRO signal magnitudes for servo wedges in data tracks in a same zone will be substantially the same.

This difference between the main servos of adjacent servo wedges and the similarity between the RRO servo portions of the adjacent servo wedges is illustrated schematically in FIG. 3. The magnitudes of the main servo signals associated with the main servos of servo wedge n, servo wedge n+1, and servo wedge n+2 are different from each other due to the absence of flight height control. In contrast, the magnitudes of the RRO signals associated with the RROs of the servo wedges n, n+1, and n+2 are substantially equal to each other.

In some implementations, the RRO signals on adjacent servo wedges are identical to each other. In some implementations, the RRO signals on adjacent servo wedges are substantially identical, yet different, although the differences are insignificant. In other implementations, the differences between the RRO signals of adjacent servo wedges are less significant than the differences between the main servo signals of the adjacent servo wedges. In such implementations, as described later, the processing of the analog signal can introduce a latency in obtaining an output. In any case, the output obtained is the data encoded in the RRO of the servo wedge that relates to data positions using which the read-out head 120 can retrieve data stored on the computer-readable medium 105. A system for providing such an output is described with reference to FIG. 4.

Figure 4:
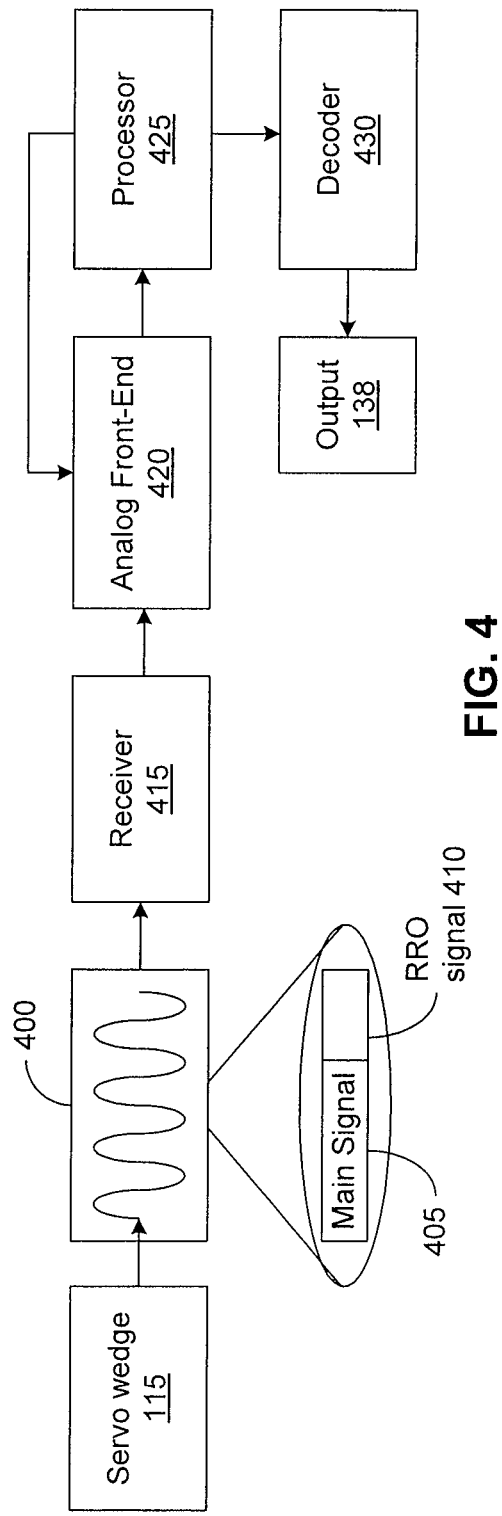
FIG. 4 shows an example of an apparatus for decoding a signal including read data position information stored in servo wedges.

FIG. 4 shows an example of an apparatus for decoding a signal including read data position information stored in servo wedges. The apparatus is configured to implement a digital technique to extract data from the RRO signal. In some implementations, the apparatus estimates a magnitude of the RRO signal, and adapts a detector gain target of the Viterbi decoder 136 in accordance with the estimate so that the output 138 matches the magnitude of the RRO signal. To do so, the apparatus includes a receiver 415 for receiving the analog signal 400 from a servo wedge 115. In some implementations, the receiver 415 receives the analog signal 400 from the read-out head 120. The analog signal includes the main servo signal 405 and the RRO signal 410. The apparatus further includes an analog front-end 420 that amplifies the analog signal 400 and converts the amplified signal into a digital signal. The digital signal is provided as input to a processor 425 that includes processing circuitry to determine an estimate of the magnitude of the RRO signal 410 included in the analog signal 400. Specifically, the processor 425 estimates the magnitude of a digital representation of the RRO signal 410 and adapts the detector gain target of a decoder 430 in accordance with the estimate. Further, the apparatus includes a decoder 430 that receives the digital signal and the adapted detector gain target and decodes the digital signal to extract the data in the RRO signal 410 so that the detector gain target matches the magnitude of the RRO signal. The detector gain target of the decoder 430 is a function of a desired amplitude of the RRO signal. In some implementations, the decoder 430 decodes the digital signal based on a Viterbi algorithm. In some implementations, the processor 425 adapts the detector gain target to be equal to the estimate of the magnitude. Alternatively, the processor 425 adapts the detector gain target to be equal to a fraction of the estimate, for example, 1/sqrt(2) of the estimate. The operations performed by the processor 425 to estimate the magnitude of the RRO signal are described with reference to FIG. 5.

Figure 5:
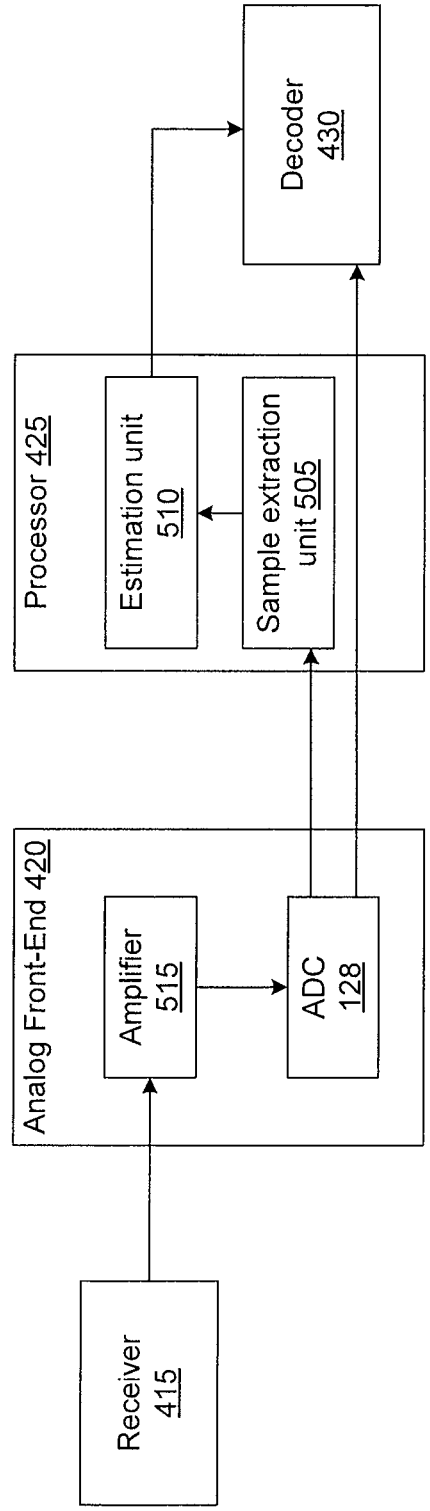
FIG. 5 shows an example of a processor for estimating an amplitude of a signal including read data position information stored in servo wedges.

FIG. 5 shows an example of a processor 425 for estimating an amplitude of a signal including read data position information stored in servo wedges. As described previously, the receiver 415 receives and forwards the analog signal 400 to the analog front-end 420. The processor 425 includes a sample extraction unit 505 configured to determine an estimate of the magnitude of the RRO signal based on sample signals extracted from a portion of the digital signal representing the preamble. In some implementations, the RRO signal 410, that includes encoded bits of data, is periodic. For example, the coded bits in one period of the RRO signal 410 can be a repeating [1, 1, −1, −1] pattern. Alternatively, the coded bits in one period are [−1, −1, 1, 1] in {−1, +1} signaling system. The RRO signal 410 received by the receiver 415 can be periodic with fundamental frequency of $f_{sfg}/4$ where $f_{sfg}$ is the sampling rate. The frequency, $f_{SFG}$, can be the frequency of the servo frequency generator, i.e., the servo clock sampling frequency. The RRO signal 410 received by the receiver 415 can be approximately expressed using equation (1) below:

$$x(t) = A * \sin(2\pi * (f_{sfg}/4) * t + \alpha) + v(t) \quad (1)$$

In equation (1), A is the unknown peak magnitude of the RRO signal 410, α is the unknown phase, and v(t) is the noise in the signal.

The analog front-end 420 includes the ADC 128 that receives and converts the analog RRO signal 410 into a digital representation of the RRO signal 410. In some implementations, described in detail later, the analog front-end 420 includes an amplifier 515 to amplify the RRO signal 410 prior to input to the ADC 128. Because the RRO signal 410 at the input to the ADC 128 is periodic, the ADC output, i.e., the digital representation of the RRO signal 410 may also be periodic.

The sample extraction unit 505 periodically extracts a sample from the digital representation of the RRO signal 410. The expressions for the signals vary depending on the baud rate, as shown in equations (2) and (3). If sampling rate is $f_{sfg}$, then the signal at the nth sampling instant is:

$$x(n) = A * \sin(0.5\pi n + \alpha) + v(n) \quad (2)$$

If the sampling rate is $2*f_{sfg}$, then the signal at the nth sampling instant is:

$$x(n) = A * \sin(0.25\pi n + \alpha) + v(n) \quad (3)$$

In some implementations, the sample extraction unit 505 collects RRO signal samples for M periods. The 4*M samples can be expressed as:

$$x(n) = A * \sin(0.5\pi n + \alpha) + v(n), n = 0, 1, \ldots 4*M-1$$

In some implementations, the processor 425 includes an estimation unit 510 to estimate the magnitude of the RRO signal 410 based on the samples extracted by the sample extraction unit 505. The estimation unit 510 can be configured to perform Discrete Fourier Transformation (DFT) on the extracted samples. In some implementations, the estimation unit 510 performs DFT at frequency, $f_{sfg}/4$, as represented by equation (4):

$$B = \sum_{n=0}^{4*M-1} x(n) e^{-j\frac{2\pi}{4}n} \quad (4)$$

In equation (4), B represents an estimate of the magnitude of the RRO preamble, A.

In equation (4), the term $$C = e^{-j\frac{2\pi}{4}n}$$

has only four possible values: 1, −j, −1, j. In such implementations, the estimation unit 510 performs addition and subtraction operations to estimate the unknown peak magnitude of the RRO signal 410, A. In such implementations, the estimation unit 510 equates |2*B/(4*M)| as the estimate of A. This equation is based on equation (5) relating B and A for noiseless signals.

$$|B| = (2*A)/(4*M) \quad (5)$$

Equation (5) is valid if the harmonic components in the signal can be ignored.

In some implementations, the estimation unit 510 is configured to perform a 4 point DFT to estimate the magnitude of the RRO signal 410. In such implementations, the digital representation of the RRO signal 410 is down-sampled. In other words, every other sample is discarded from the DFT operation. The resultant signal will be the same as that used in baud-rate sampling systems. Thus, the methods used in baud-rate sampling system can be used to estimate the magnitude of the RRO signal 410 in over-sampling systems. A baud-rate system is one in which there is one sample generated per information symbol. An oversampled system is one in which there is more than one sample generated per information symbol.

In some implementations, the estimation unit 510 is configured to perform an 8 point DFT to estimate the magnitude of the RRO signal 410. In such implementations, the sample extraction unit 505 collects samples from the digital representation of the RRO signal 410 for M periods. The 8*M samples can be expressed using equation (6):

$$x(n) = A * \sin(0.25\pi n + \alpha) + v(n), n = 0, 1, \ldots, 8*M-1 \quad (6)$$

The estimation unit 510 performs the DFT at frequency, $f_{sfg}/4$, as represented by equation (7):

$$B = \sum_{n=0}^{8*M-1} x(n) e^{-j\frac{2\pi}{8}n} \quad (7)$$

Subsequently, the estimation unit 510 equates |2*B/(8*M)| as the estimate of the magnitude of the RRO signal 410. In such implementations, the operations that the estimation unit 510 performs include additions, subtractions, and multiplications, for example, with complex coefficients.

When the estimation unit 510 uses an averaged 4 point DFT to estimate the magnitude of the RRO signal 410, the method divides the input, for example, input from the ADC 128, into two interleaved sub-streams, and uses only one sub-stream to estimate the magnitude of the RRO signal 410.

In some implementations, the DFT can be performed over the discarded sub-stream. In such implementations, the estimation unit 510 can equate the average of the estimates of the magnitude, obtained from each sub-stream, as the magnitude of the RRO signal 410.

In some implementations, the processor 425 adapts the detector gain target of the decoder 430 to be [A, A, −A, A] or [−A, −A, A, A]. In other implementations, the processor 425 adapts the detector gain target to be a fraction of the estimated magnitude of the RRO signal 410. To do so, rather than sampling the peak magnitude of the RRO signal 410, the sample extraction unit 505 extracts samples from the shoulders of the periodic RRO signal 410. For example, the processor 425 adapts the detector gain target to be [A/$\sqrt{2}$, A/$\sqrt{2}$, −A/$\sqrt{2}$, −A/$\sqrt{2}$] or [−A/$\sqrt{2}$, −A/$\sqrt{2}$, A/$\sqrt{2}$, A/$\sqrt{2}$] in baud-rate sampling systems. In over-sampling systems, the processor 425 adapts the detector gain target for the RRO signal 410 to be [0, A/$\sqrt{2}$, A, A/$\sqrt{2}$, 0, −A/$\sqrt{2}$, −A, −A/$\sqrt{2}$]. In such systems, the decoder 430 uses the sub-stream corresponding to shoulder samples. Therefore, in both sampling systems, the samples for the RRO signal 410 used by the decoder 430 will be either [A/$\sqrt{2}$, A/$\sqrt{2}$, −A/$\sqrt{2}$, −A/$\sqrt{2}$] or [−A/$\sqrt{2}$, −A/$\sqrt{2}$, A/$\sqrt{2}$, A/$\sqrt{2}$].

There is a connection between the magnitude of the preamble of the RRO signal 410 and the magnitudes for RRO SM/Data, 235, 240. For example, user-bits for RRO SM/Data are encoded in biphase code, for example, Manchester code. User bit 1 is encoded as [1, 1, 0, 0] and user bit 0 is encoded as [0, 0, 1, 1]. In this example and in implementations in which the decoder 430 is a Viterbi decoder, the equalization target is PR4 (response=1−$D^2$). Then, an implementation of the Viterbi algorithm employed by the Viterbi decoder uses four samples for a user-bit translation. When equalization is optimum, these samples are:

[−A/$\sqrt{2}$, −A/$\sqrt{2}$, A/$\sqrt{2}$, A/$\sqrt{2}$] for transition of user-bit 0 to user-bit 0;
[0, 0, −A/$\sqrt{2}$, −A/$\sqrt{2}$] for transition of user-bit 0 to user-bit 1;
[0, 0, A/$\sqrt{2}$, A/$\sqrt{2}$] for transition of user-bit 1 to user-bit 0; and
[A/$\sqrt{2}$, A/$\sqrt{2}$, −A/$\sqrt{2}$, −A/$\sqrt{2}$] for transition of user-bit 0 to user-bit 0.

Note that the value, A/$\sqrt{2}$, or a scaled version of the estimate of the peak value of the magnitude of the RRO signal 410, A, is the Viterbi decoder gain target in implementations in which the decoder 430 employs the Viterbi algorithm to decode the RRO signal 410 to extract the RRO data. Thus, in the aforementioned technique, the value of A is estimated by performing DFT over extracted samples of the RRO signal 410. The Viterbi decoder gain target is adapted according to the estimate so that the Viterbi decoder gain target matches the RRO signal 410. The process performed by the apparatuses shown in FIGS. 4 and 5 are summarized with reference to FIG. 6.

Figure 6:
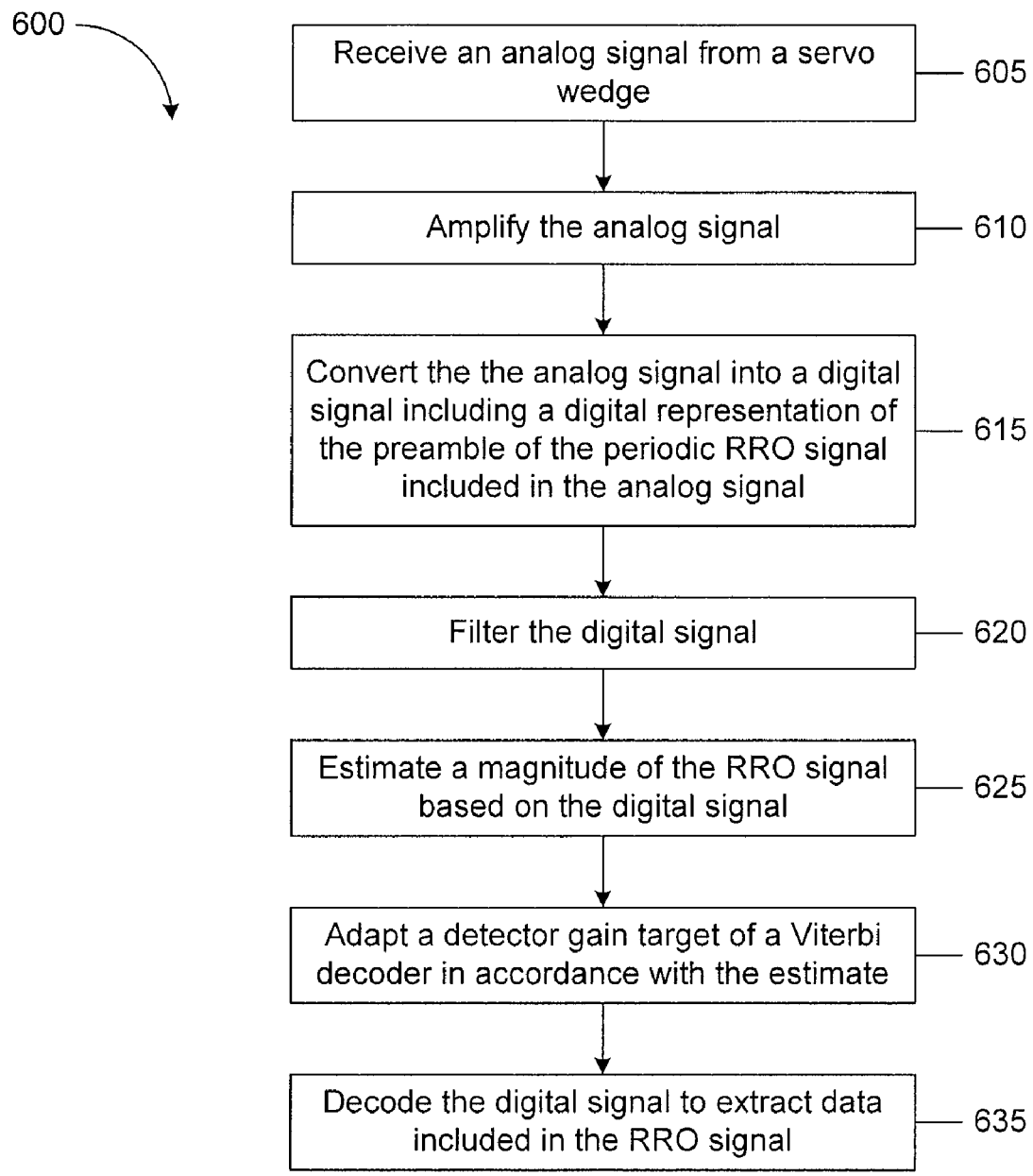
FIG. 6 is a flow chart of an example of a process for decoding a signal including read data position information stored in servo wedges.

FIG. 6 is a flow chart of an example of a process 600 for decoding a signal including read data position information stored in servo wedges. At 605, the process 600 receives an analog signal from a servo wedge. For example, the receiver 415 receives the analog signal 400 that includes the main servo signal 405 and the RRO signal 410 representing data encoded on the servo wedge 115 from the read-out head 120. At 610, the process 600 amplifies the analog signal. For example, the amplifier 515 amplifies the analog signal 400 including the RRO signal 410. At 615, the process 600 converts the analog signal into a digital signal that includes a digital representation of the preamble of the periodic RRO signal included in the analog signal. For example, the ADC 128 converts the analog signal 410 into the digital signal to generate the digital representation of the RRO signal 410. At 620, the process 600 filters the digital signal. For example, the FIR 134 filters the digital signal.

In some implementations, the output of the ADC 128 is provided to the FIR 134, as shown in FIG. 1. In such implementations, the FIR 128 can preserve the signal component of the digital representation with frequency being $f_{sfg}/4$. Thus, the RRO signal 410 output by the FIR 134 will be periodic and have the same format as that at the output of the ADC 128.

At 625, the process 600 estimates the magnitude of the RRO signal based on the digital signal. Further, at 630, the process 600 adapts the detector gain target of the decoder in accordance with the estimated. For example, the sample extraction unit 505 extracts samples from the digital representation of the RRO signal 410, and the estimation unit 510 estimates the magnitude of the RRO signal 410 from the extracted samples, as described previously. In some implementations, to estimate the magnitude of the RRO signal 410, the sample extraction unit 505 in the processor 425 extracts samples from the same source as the decoder 430. For example, if the decoder 430 receives input from the FIR 134, then the sample extraction unit 505 extracts samples from the output of the FIR 134. Alternatively, if the decoder 430 receives input from the ADC 128, then the sample extraction unit 505 extracts samples from the output of the ADC 128. In other implementations, the samples can be extracted from the ADC 128 although the decoder 430 receives input from the FIR 134. In such implementations, a relationship between the output of the ADC 128 and that of the FIR 134 can be determined, and the samples extracted from the output of the ADC 128 can be scaled to match the output of the FIR 134. Scaling the output of the ADC 128 can be performed by multiplying an output of the estimation unit 510 by a vector, y. In some implementations, the gain of FIR 134 at frequency, $f_{sfg}/4$, equals 1. In such implementations, the sample extraction unit 505 can extract samples from either the output of the ADC 128 or the output of the FIR 134, regardless of the source from which the decoder 430 receives input. At 635, the process 600 decodes the digital signal to extract data in the RRO signal.

Using the above-described digital techniques, the decoder 430 decodes the RRO signal 410 to obtain encoded data. To obtain the data encoded in the main servo signal 405, the decoder 430 uses a default detector gain target associated with the main servo signal 410. Once the main servo signal 405 is decoded, and prior to decoding the RRO signal 410, the detector gain target is adapted, as described with reference to FIG. 7.

Figure 7:
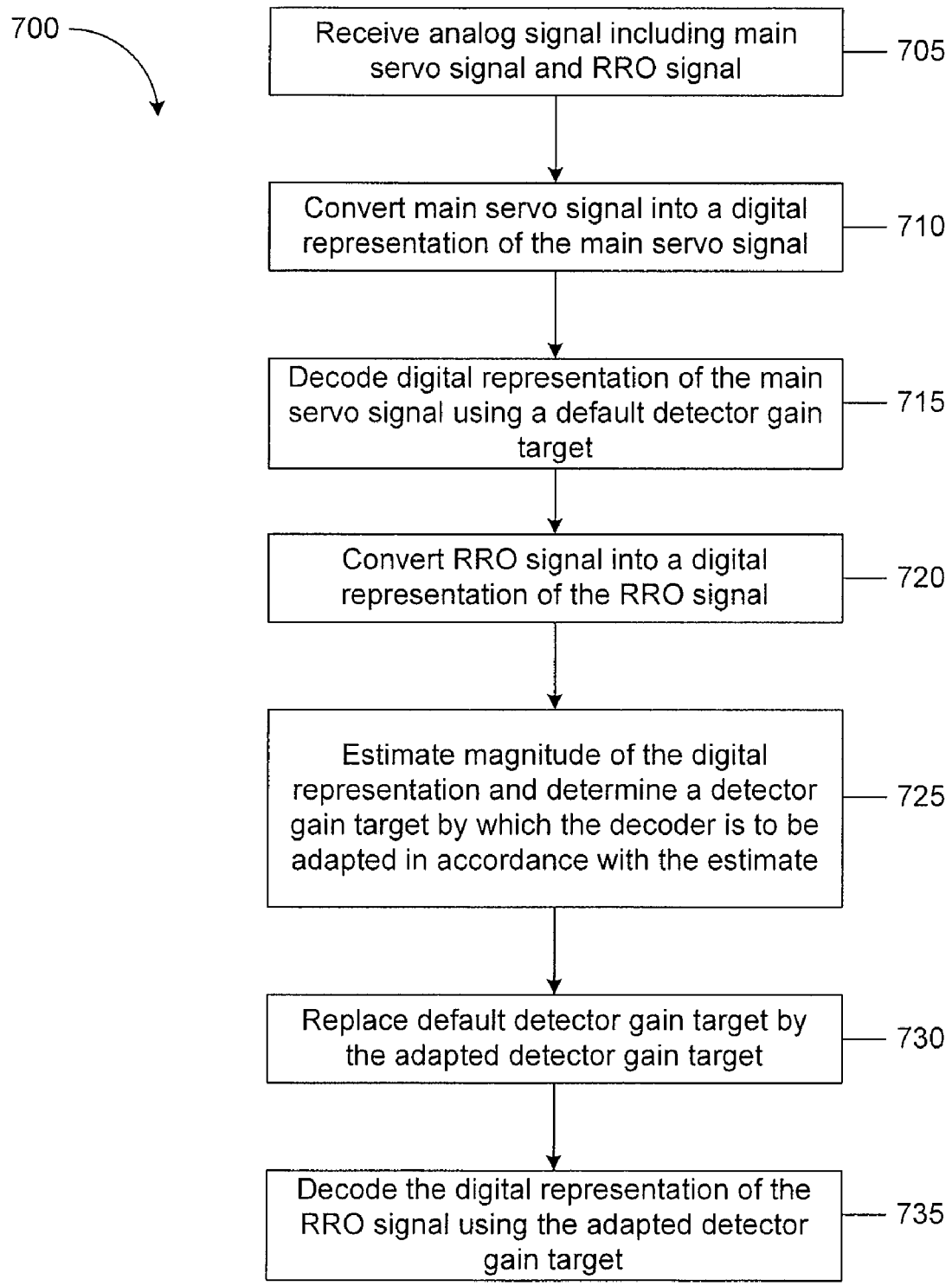
FIG. 7 is a flow chart of an example of a process for estimating an amplitude of a signal including read data position information stored in servo wedges.

FIG. 7 is a flow chart of an example of a process 700 for estimating an amplitude of a signal including read data position information stored in servo wedges. At 705, 710, and 715, the process 700 receives the analog signal 410, converts the main servo signal into a digital representation of the main servo signal, and decodes the digital representation of the main servo signal using a default detector gain target, respectively. For example, the system 100 can perform these operations. Subsequently, at 720, the process 700 converts the RRO signal into a digital representation of the RRO signal. At 725, the process 700 estimates the magnitude of the digital representation of the RRO signal 410 and determines a detector gain target by which the decoder is to be adapted in accordance with the estimate. At 730, the process 700 replaces the default detector gain target by the adapted detector gain target, and at 735, decodes the digital representation of the RRO signal, as described previously.

In some implementations, instead of using the default detector gain target to decode the main servo signal 405, samples can be extracted from the digital representation of the main servo signal 405, the magnitude of the main servo signal 405 can be estimated, and the detector gain target for decoding the main servo signal 405 can be adapted in accordance with the estimated magnitude. In such implementations, the servo timing loop (STL) 130 is configured to adjust the sampling phase of the ADC 128 so that the sampling is performed at correct instants. In alternative implementations, the STL 130 can receive input from the FIR 134. In some implementations, the STL 130 can be configured to adjust the sampling phase when the estimate of the magnitude of the RRO signal 410 is determined. Alternatively, the STL 130 can be used only for estimating the main servo signal 405 magnitude. Because the RRO signal 410 preamble is short, the RRO signal 410 need not use the STL 130. Instead, the RRO signal 410 can use a scheme, for example, the RRO Zero-Padded Suffix (ZPS), to control sampling. In some implementations, after adapting the detector gain target of the decoder 430 to decode the RRO signal 410, the detector gain target of the decoder 430 can be restored to the default detector gain target of the main servo signal 410 to decode the signal 410 of the subsequent servo wedge. The restoring is described with reference to FIG. 8.

Figure 8:
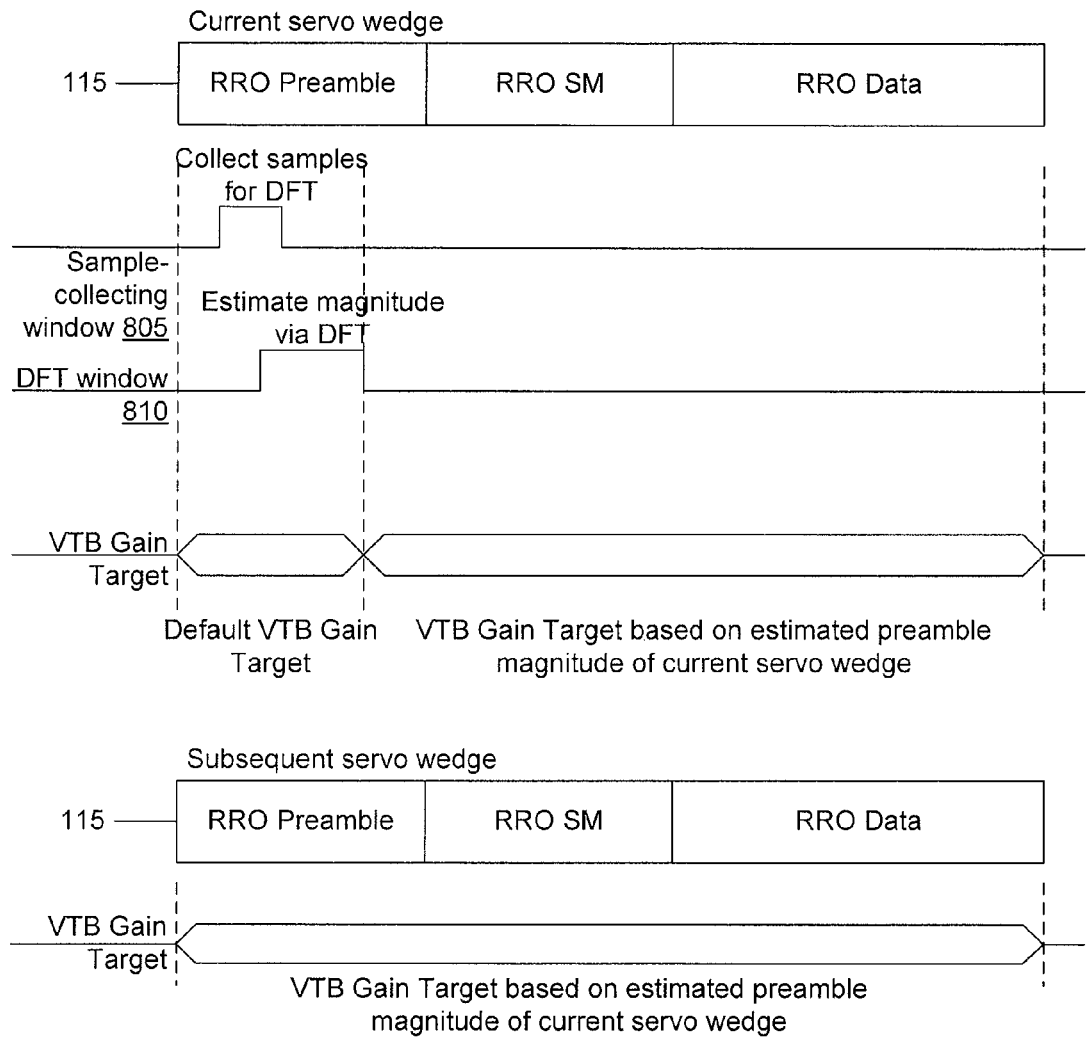
FIG. 8 shows a flow diagram of an example of a process for replacing a default detector gain target of a decoder with a determined detector gain target.

FIG. 8 shows a flow diagram of an example process for replacing a default detector gain target of a decoder with a determined detector gain target. When the processor 425 receives the RRO signal 410 including the RRO preamble 230, RRO SM 235, and RRO data 240, the detector gain target of the decoder 430, for example, the Viterbi decoder, is the default detector gain target. The sample extraction unit 505 extracts samples in a sample collecting window 805 and the estimation unit 510 performs DFT in a DFT window 810 to estimate the magnitude of the RRO preamble. When the estimation unit 510 determines an estimate of the magnitude of the RRO preamble, the default Viterbi gain target is replaced with a new detector gain target based on the estimated magnitude of the RRO preamble.

In implementations employing a model that the RRO signals 410 of different servo wedges are identical, the detector gain target used by the decoder to obtain the RRO data encoded on a subsequent servo wedge can be equal to the detector gain target for the current servo wedge. The detector gain target of the subsequent servo wedge can be the same as the detector gain target of the current servo wedge in a model that assumes that the RRO signals of different servo wedges, for example, servo wedges that are positioned on the same data track, are different, but the differences are insignificant. In both of the aforementioned models, the processor 425 can estimate the magnitude of the RRO signal 410 for a current servo wedge, adapt the detector gain target based on the estimate of the magnitude, but use the adapted detector gain target to obtain the data encoded in the RRO signal 410 obtained from the subsequent servo wedge. In implementations employing a model that assumes that the RRO signals of different servo wedges are different, a detector gain target can be determined for the RRO signal 410 obtained from each servo wedge. In such implementations, the detector gain target determined for a current servo wedge can be used to obtain data in the RRO signal of the subsequent servo wedge. Alternatively, in such implementations, the detector gain target can be used to obtain data in the RRO signal of the current servo wedge itself. In such implementations, a latency in obtaining the encoded data is introduced in comparison to implementations in which calculations performed on a current wedge are used on a subsequent wedge.

Alternatives to the aforementioned digital techniques for decoding an RRO signal 410 to obtain data encoded on a servo wedge 115 include analog techniques that employ amplifiers and gain control units that regulate the gain of the amplifiers. Such techniques are described with reference to the figures that follow.

Figure 9:
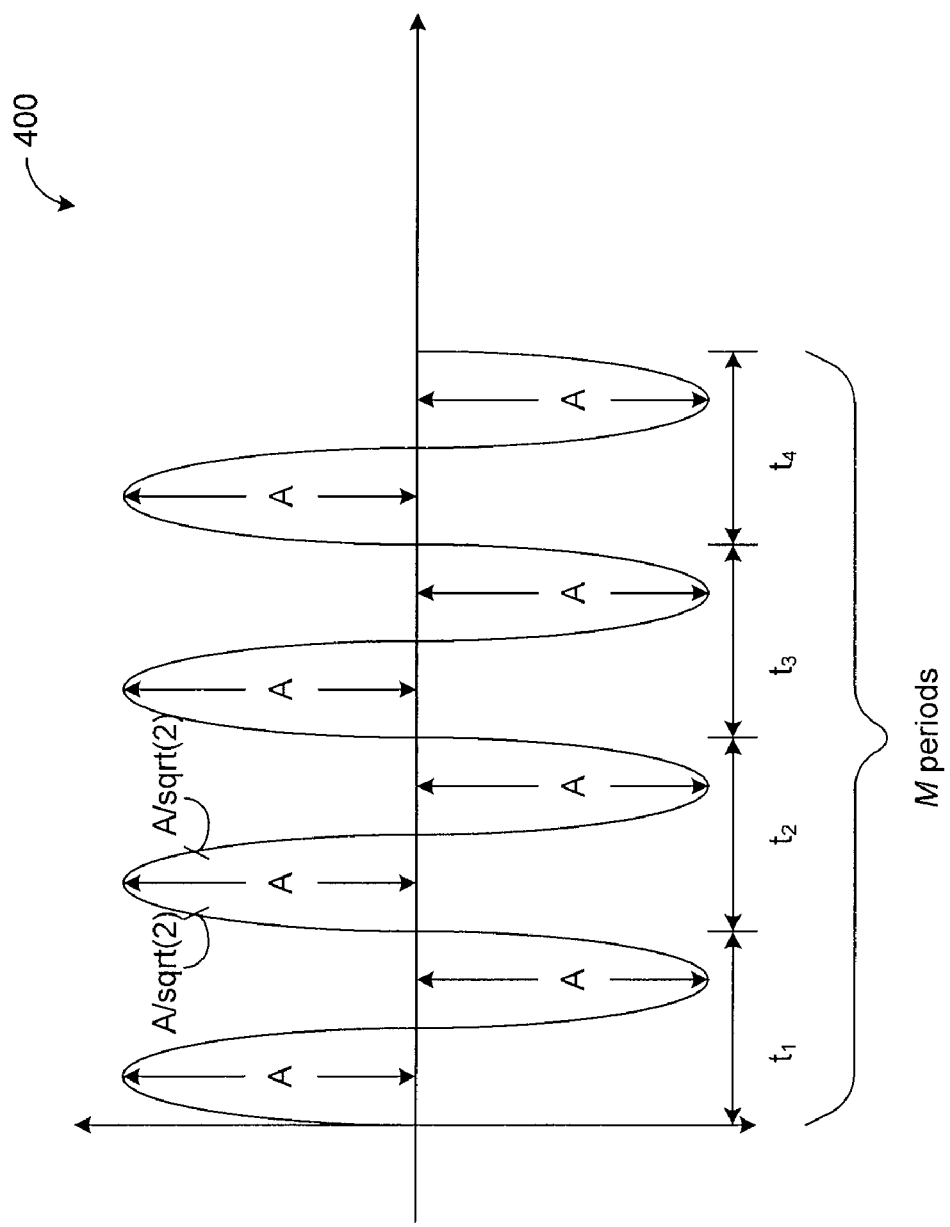
FIG. 9 illustrates a periodic analog signal having an amplitude and time period.

FIG. 9 shows a periodic analog signal 400 having a peak amplitude, A, and time period, t. The analog signal 400 includes the main servo signal 405 and the RRO signal 410. Similar to the digital techniques, the analog techniques also sample digital representations of the RRO signal, for example, for M time periods, to determine an estimate of the amplitude of the RRO signal 410. As described previously, in some implementations, the detector gain target of the decoder 430 is equated to $A/\sqrt{2}$. An apparatus implementing the analog techniques for obtaining the data in the RRO signal 410 from the analog signal 400 is described with reference to FIGS. 10 and 11.

Figure 10:
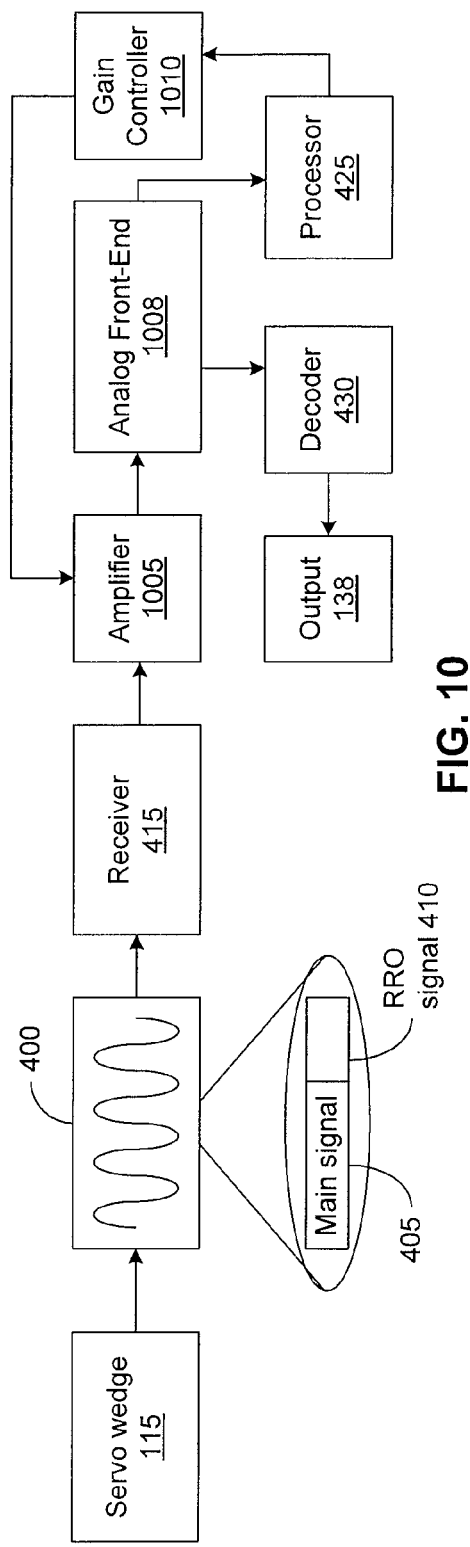
FIG. 10 shows an example of an apparatus for decoding a signal including read data position information stored in servo wedges.

FIG. 10 shows an example of an apparatus for decoding a signal including read data position information stored in servo wedges. The apparatus includes a receiver 415 for receiving an analog signal 400, that includes a main servo signal 405 and an RRO signal 410, from a servo wedge 115. The apparatus also includes an amplifier 1005, for example, a variable gain amplifier, for amplifying the analog signal 400. Upon amplifying the signal, the amplifier 1005 transmits the analog signal 400 to an analog front-end 1008 that converts the analog signal 400 into a digital signal that includes a digital representation of the RRO signal 410. A processor 425 receives the digital signal from the analog front-end 1008 and determines an estimate of the amplitude of the RRO signal 410 using techniques described previously. The apparatus further includes a gain controller 1010 that receives the estimate of the amplitude of the RRO signal 410, and controls a gain of the amplifier 1005. In this manner, the amplifier 1005 and gain controller 1010 form a feedback circuit to control the amplification of the analog signal 400. The output of the analog front-end 1008 is provided to the decoder 430, for example, a decoder executing a Viterbi algorithm, that obtains the data encoded in the RRO signal 410 and provides the data as an output 138. The operations performed by the components of the apparatus shown in FIG. 10 are described with reference to FIG. 11 and in more detail with reference to FIG. 12.

Figure 11:
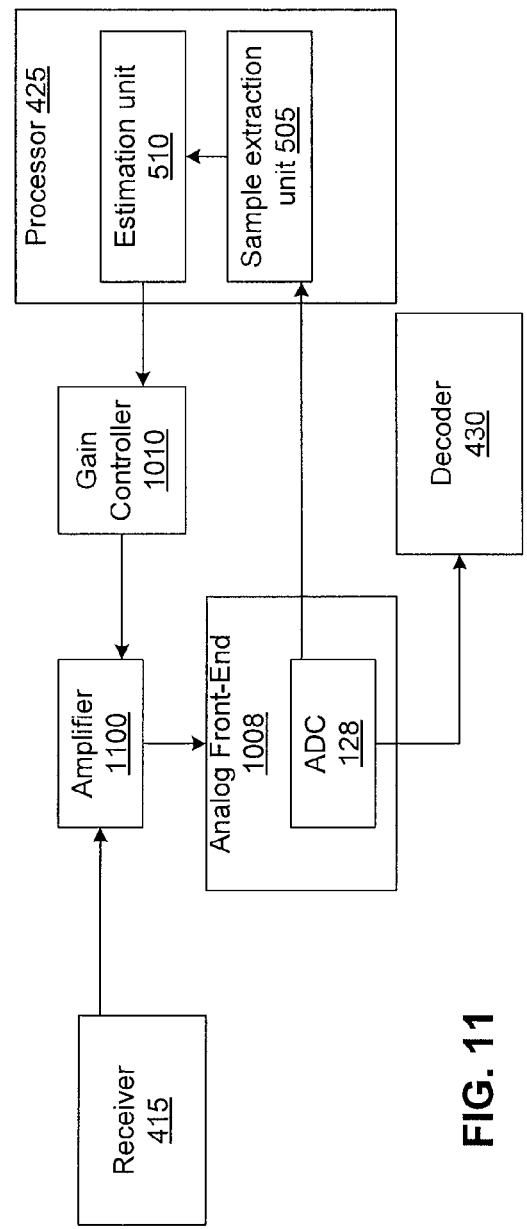
FIG. 11 shows an example of an apparatus for estimating an amplitude of a signal including read data position information stored in servo wedges.

FIG. 11 shows an example of an apparatus for estimating an amplitude of a signal including read data position information stored in servo wedges. The analog front-end 1008 includes an ADC 128 to convert the analog signal 400 into a digital signal. The processor 425 includes a sample extraction unit 505 and an estimation unit 510 to extract samples from the digital representation of the RRO signal 410 and to estimate an amplitude of the RRO signal 410 from the extracted samples, respectively, using techniques described previously. In some implementations, the estimation unit 510 uses DFT to estimate the amplitude of the RRO signal, and transmits the estimate to the gain controller 1010.

Figure 12:
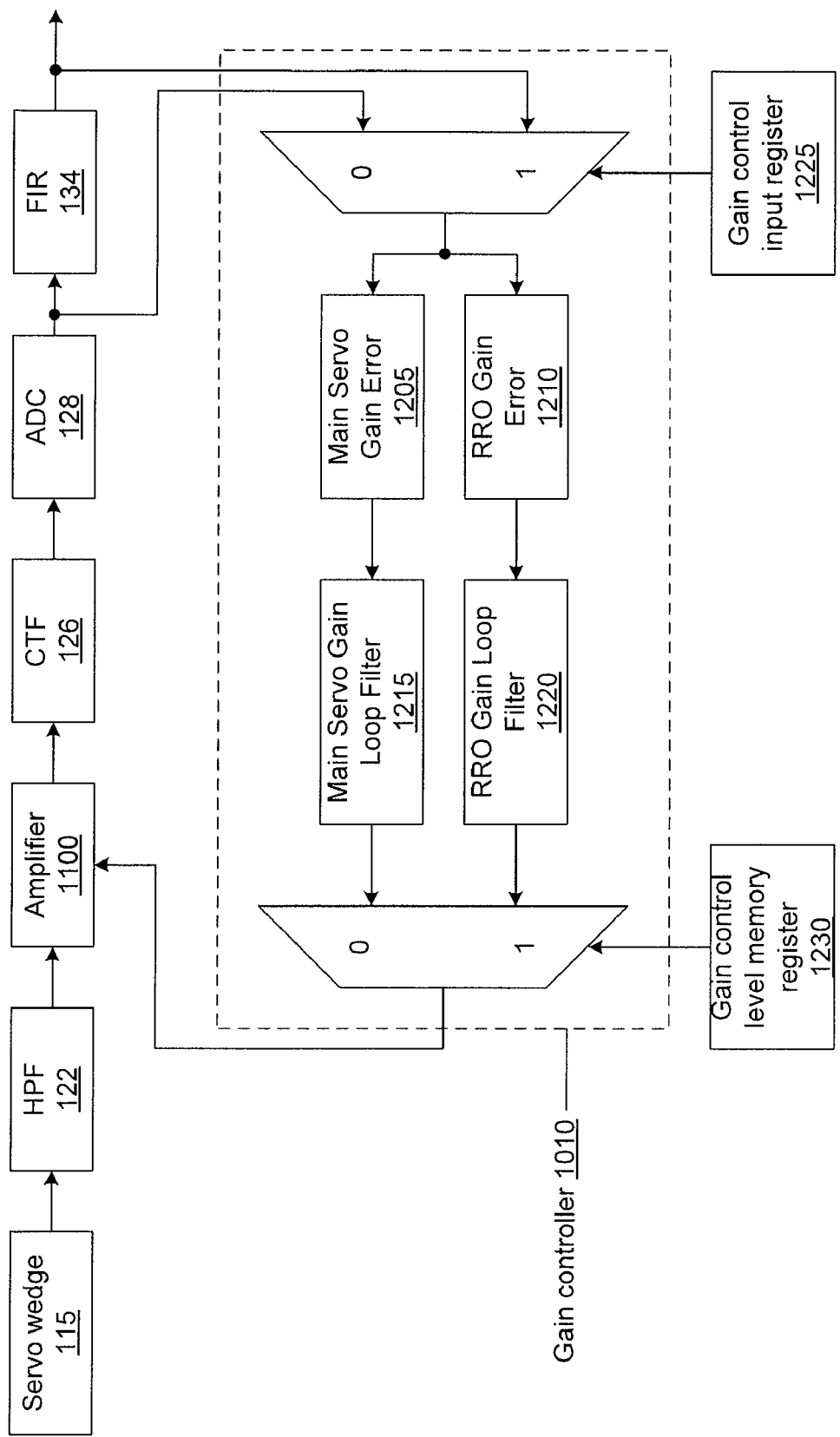
FIG. 12 shows an example of a gain controller for controlling a gain of an amplifier based on an estimate of a signal including read data position information stored in servo wedges.

FIG. 12 shows an example of a gain controller 1010 for controlling a gain of an amplifier 1100 based on an estimate of a signal including read data position information stored in servo wedges. The gain controller 1010 receives the estimate of the amplitude of the RRO signal from the processor 425 and compares the estimate of the amplitude and a specified level. Based on the comparison, the gain controller 1010 generates an error signal representing the difference between the estimate and the specified level. Further, the gain controller 1010 adjusts the gain by which the amplifier 1100 amplifies the analog signal so that the error represented by the error signal decreases. The specified level represents a desired gain, established for the gain controller 1010. If the amplifier 1100 amplifies the analog signal 400 by desired gain, then the output 138 obtained from the decoder 430 will closely match the actual data encoded in the RRO signal 410.

In some implementations, input to the gain controller 1010 can be taken from the output of the ADC 128. In alternative implementations, input to the gain controller 1010 can be taken from the output of the FIR 134. This is selected by assigning a value to the gain control input register 1225. The value can be fixed or variable. In some implementations, the operations of sampling, estimating, and generating the error signal are performed only on the RRO signal 410. In alternative implementations, these operations are performed on both the main servo signal 405 and the RRO signal 410. The apparatus can be configured to toggle between the two implementations by enabling the gain controller 1010 to include or exclude the main servo signal 405 from the sampling and extracting operations.

If the gain controller 1010 is enabled, then the Main Servo Gain Error at block 1205 will generate an error signal for the main servo signal 405 by comparing the input signal received from the ADC 128 against the specified level. In some implementations, the gain controller 1010 includes a Main Servo Gain Loop Filter 1215 to filter the gain error represented by the error signal. The gain controller 1010 adjusts the gain of the amplifier 1100 based on the gain error. The amplifier 1100 adjusts the amplification of the analog signal 400, which causes the amplification of the main servo signal 405 to be adjusted.

After the main servo signal 405 amplification is adjusted based on the error signal, the gain controller 1010 is disabled until the PES signals included in the main servo signal 410 are transmitted by the amplifier 1100. Consequently, all portions of the main servo signal 410 are amplified by the same gain. When the RRO signal 410 is received, the gain controller 1010 is re-enabled. Subsequently, the gain controller 1010 generates an error signal for the RRO signal. To do so, the gain controller 1010 includes an RRO Gain Error at block 1210 that receives an estimate of the amplitude of the RRO signal 410, which is provided by the estimation unit 510, prior to generating the error signal. In some implementations, the gain controller 1010 includes an RRO Gain Loop Filter 1220 to filter the gain error of the RRO signal. An example of the gain error signal generated by the RRO Gain Error block is:

$$rro\_gain\_err = P_d - A_{est} \quad (8)$$

In equation (8), $P_d$ is the desired peak amplitude, and $A_{est}$ is the estimated preamble peak amplitude. The operations performed by the RRO Gain Loop Filter 1220 can be represented as:

$$filter\_out(n) = filter\_out(n-1) + BW*rro\_gain\_err \quad (9)$$

In equation (9), BW is the loop filter bandwidth, filter_out(n) is the filter output after update based on the current RRO signal 410 accessed from a current servo wedge, and filter_output(n−1) is the filter output based on the previous RRO signal accessed from a previous servo wedge.

The RRO Gain Loop Filter 1220 can have the same structure as the Main Servo Gain Loop Filter 1215. The bandwidths of the two filters can be different. In some implementations, the preamble peak amplitude for the main servo signal 405 is obtained by directly detecting the preamble peak and measuring the peak amplitude. This operation is enabled by the length of the main servo preamble which allows performing regular timing acquisition and can negate the need for sample extraction and estimation.

Based on the error signal generated by the RRO Gain Error at block 1210, the gain controller 1010 adjusts the gain of the amplifier 1100. The amplifier 1100 amplifies the RRO signal 410, specifically the RRO preamble. Subsequently, the gain controller 1010 is disabled and the gain of the amplifier 1100 is held constant until the entire RRO signal 410 is amplified. In some implementations, the value of the gain error signal generated by the RRO Gain Error at block 1210 can be stored in a gain control level memory register 1230 for future use, as described below.

Figure 13:
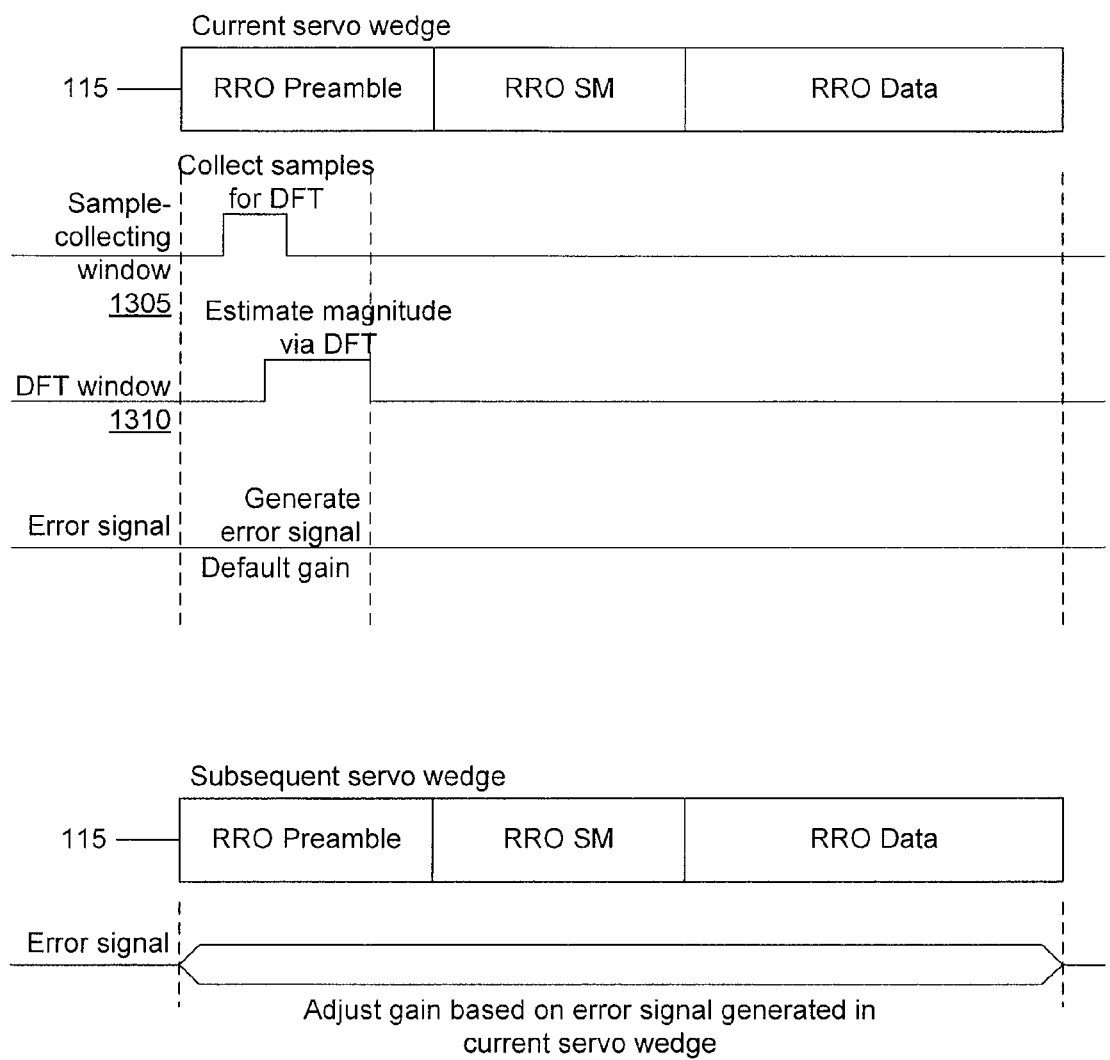
FIG. 13 shows a flow diagram for applying a gain error generated for a current servo wedge to amplify an RRO signal of a subsequent servo wedge.

FIG. 13 shows a flow diagram for applying a gain error generated for a current servo wedge to amplify the RRO signal of a subsequent servo wedge. When the processor 425 receives the RRO preamble portion of the RRO signal 410, the sampling unit 505 collects samples for DFT in a sample collecting window 1305. Each sample is a point on the sinusoidal wave shown in FIG. 9. In some scenarios, four samples per sinusoidal waveform can be selected by establishing time period, $t_{sfg} = 1/f_{sfg}$. Each point on the sinusoidal wave can be temporally equidistant from each other. All four points can be collected during the positive cycle. Alternatively, two points can be collected during the positive cycle and two during the negative cycle. The amplitude, A, represents the peak value of the sinusoidal curve. The four temporally equidistant samples may or may not include the peak value. In some scenarios, the four samples may not be temporally equidistant. The estimation unit 510 performs DFT using the collected samples to estimate the peak value, A, based on the values of the four samples in a DFT window 1310. The gain controller 1010 establishes a default gain by which the amplifier 1100 will amplify the RRO signal 410. Upon receiving the estimate of the peak amplitude from the processor 425, the gain controller 1010 replaces the default gain with the gain determined based on the error signal.

In some implementations, the gain controller 1010 controls the amplifier 1100 to amplify the RRO signal 410 of the current wedge based the determined gain. In such implementations, a latency may be introduced in the apparatus. In some implementations, the gain controller 1010 amplifies the RRO signal 410 obtained from the current wedge using the default gain, and amplifies the RRO signal obtained from the subsequent wedge using the gain determined based on the error signal. In such implementations, the gain controller 1010 stores the gain determined based on the error signal in the gain control level memory register 1230. The gain controller 1010 delays the provision of the generated error signal for application to a subsequent RRO signal encoded in a subsequent servo wedge.

In such implementations, the apparatus receives an analog representation of the subsequent RRO signal from the subsequent servo wedge. The gain controller 1010 provides the error signal generated for the current wedge to the amplifier. The amplifier amplifies the subsequent RRO signal based on the error signal generated for the current servo wedge. The amplified RRO signal of the subsequent servo wedge is converted into a digital representation by the ADC. The operations of sampling and estimating are performed on the digital representation, as described previously. The gain controller receives the estimate of the peak amplitude of the RRO signal of the subsequent servo wedge, generates another error signal, and stores the error signal for application to the RRO signal that the apparatus will receive from the servo wedge that follows in a sequence of servo wedges encoded on a data track of the computer-readable storage medium. The sequence includes n servo wedges encoded on the circular data track. When the analog signal is received from the nth servo wedge that is prior to the current servo wedge, the gain controller 1010 generates an nth error signal and applies the nth error signal to control a gain of the amplified RRO signal of the current servo wedge.

Figure 14:
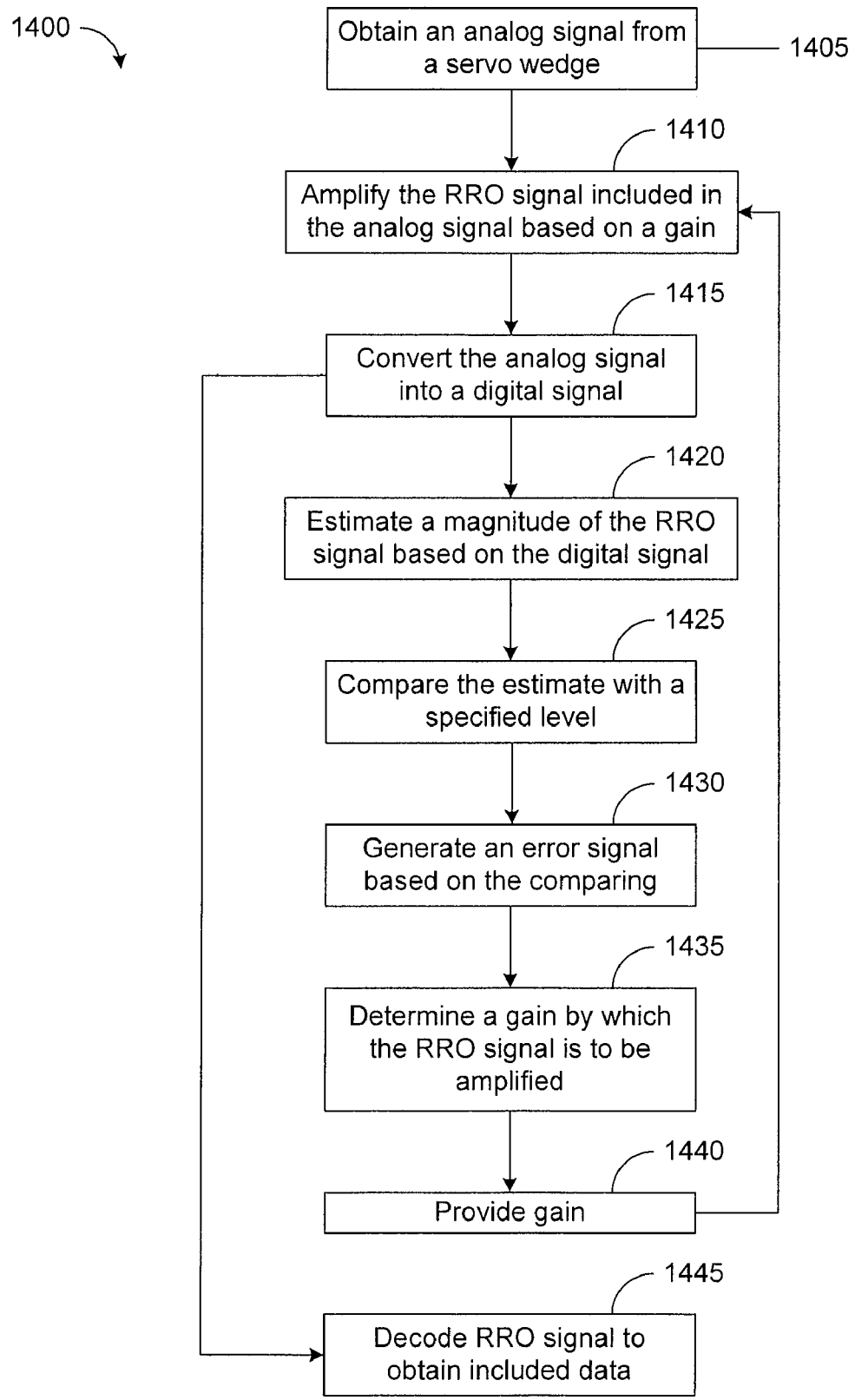
FIG. 14 shows a flow chart of an example process for providing an error signal.

FIG. 14 shows a flow chart of an example process 1400 for providing an error signal. The process 1400 summarizes the analog techniques described previously for obtaining RRO data in an analog signal received from a servo wedge. Using techniques described previously, at 1405, the process 1400 obtains an analog signal from a servo wedge and at 1410, amplifies the RRO signal included in the analog signal based on a gain. At 1415, the process 1400 converts the analog signal into a digital signal, and at 1420, estimates a magnitude of the RRO signal based the digital signal. At 1425, the process 1400 compares the estimate with a specified level and at 1430, generates generate an error signal based on the comparing. Based on the error signal, at 1435, the process determines a gain by which the RRO signal is to be amplified and at 1440, provides the gain. At 1410, the RRO signal included in the analog signal is amplified based on the gain and at 1445, is decoded to obtain included data.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims. In some implementations, the digital and analog techniques described above can be combined to obtain the RRO signal data. For example, a detector gain target of the decoder can be adapted based on the estimate of the magnitude of the RRO signal. Simultaneously, based on the estimate of the magnitude, a gain of the amplifier can also be controlled.

What is claimed is:

1. A method comprising:
    obtaining a digital signal representing a repeatable runout (RRO) signal included in an analog signal of a computer-readable storage medium, the RRO signal including a preamble that represents a magnitude of the RRO signal, and data, the digital signal including a digital representation of the preamble;
    determining, by processing circuitry, an estimate of the magnitude of the RRO signal based on the digital representation of the preamble;
    comparing, by the processing circuitry, the estimate of the magnitude of the RRO signal and a specified level to generate an error signal based on a difference between the estimate and the specified level; and
    delaying provision of the generated error signal for application to a subsequent RRO signal of the computer-readable storage medium,
    wherein the RRO signal is amplified prior to being represented as the digital signal to match a value established to decode the RRO signal.

2. The method of claim 1, wherein obtaining the digital signal further comprises:
    receiving the analog signal from a read-out head configured to read data location information stored on a servo wedge;
    amplifying the RRO signal received from the servo wedge; and
    converting the RRO signal into the digital signal, wherein the RRO signal is amplified prior to the converting.

3. The method of claim 1, wherein the analog signal is encoded on a servo wedge in a data track of the computer-readable medium, the method further comprising providing the generated error signal for application to a subsequent RRO signal encoded in a subsequent servo wedge on the data track of the computer-readable storage medium.

4. The method of claim 1, further comprising:
    receiving an analog representation of a subsequent RRO signal from a subsequent servo wedge in a sequence of servo wedges on a data track of the computer-readable medium;
    amplifying the subsequent RRO signal by controlling a first gain of the amplified subsequent RRO signal to match a subsequent specified gain;
    converting the amplified subsequent RRO signal to a subsequent digital signal;

determining a subsequent estimate of a subsequent magnitude of the subsequent RRO signal;
generating a subsequent error signal based on a difference between the subsequent estimate and a subsequent specified level representing a second gain to be obtained to extract subsequent data from the subsequent RRO signal; and
applying the subsequent error signal to control a third gain of an amplified next RRO signal received from a next servo wedge that follows the subsequent servo wedge in the sequence.

5. The method of claim 1, further comprising:
generating an nth error signal representing an error signal of a servo wedge that is prior to a servo wedge in the data track on which the analog signal is encoded; and
applying the nth error signal to control a gain of the amplified RRO signal.

6. The method of claim 1, wherein determining the estimate comprises determining the estimate using Discrete Fourier Transformation (DFT) based on a baud-rate sampling system and four sample signals are extracted from the digital signal.

7. The method of claim 1, wherein determining the estimate comprises determining the estimate using Discrete Fourier Transformation (DFT) based on an over-sampling system and eight sample signals are extracted from the digital signal.

8. The method of claim 7, wherein the eight sample signals are divided into two interleaved sets, each including four sample signals.

9. An apparatus comprising:
an input element;
an output element; and
processing circuitry coupled with the input element and the output element and configured to perform operations comprising:
obtaining a digital signal representing a repeatable runout (RRO) signal included in an analog signal of a computer-readable storage medium, the RRO signal including a preamble that represents a magnitude of the RRO signal, and data, the digital signal including a digital representation of the preamble,
determining an estimate of the magnitude of the RRO signal based on the digital representation of the preamble,
comparing the estimate of the magnitude of the RRO signal and a specified level to generate an error signal based on a difference between the estimate and the specified level, and
delaying provision of the generated error signal for application to a subsequent RRO signal of the computer-readable storage medium,
wherein the RRO signal is amplified prior to being represented as the digital signal to match a value established to decode the RRO signal.

10. The apparatus of claim 9, wherein the analog signal is encoded on a servo wedge in a data track of the computer-readable medium, the apparatus further comprising:
a receiver configured to receive an analog representation of the subsequent RRO signal from a subsequent servo wedge in a sequence of servo wedges on a data track of the computer-readable medium;
an amplifier configured to amplify the subsequent RRO signal by controlling a gain of the amplified subsequent RRO signal to match a subsequent specified gain;
an analog to digital converter configured to convert the amplified subsequent RRO signal to a subsequent digital signal, and wherein
the operations further comprising:
determining a subsequent estimate of a subsequent magnitude of the subsequent RRO signal,
generating a subsequent error signal based on a difference between the subsequent estimate and a subsequent specified level representing a gain to be obtained to extract subsequent data from the subsequent RRO signal, and
applying the subsequent error signal to control a gain of an amplified next RRO signal received from a next servo wedge that follows the subsequent servo wedge in the sequence.

11. The apparatus of claim 9, further comprising a decoder configured to decode the digital signal based on a Viterbi algorithm so that a value established to decode the signal matches the amplitude of the RRO signal.

12. The apparatus of claim 9, wherein the operations for determining the estimate further include determining the estimate using Discrete Fourier Transformation (DFT) based on an over-sampling system and eight sample signals are extracted from the digital signal, wherein the eight sample signals are divided into two interleaved sets, each including four sample signals.

13. A system comprising:
a receiver configured to receive a plurality of analog signals from a corresponding plurality of servo wedges encoded in a sequence on a data track of a computer-readable medium, each analog signal including a corresponding repeatable runout (RRO) signal that includes a preamble signal representing a magnitude of the corresponding RRO signal, and data;
an amplifier configured to amplify an RRO signal received from a servo wedge in the sequence to match a value established to decode the RRO signal, wherein a gain of the amplified RRO signal is controlled to match a specified gain that enables matching the value established to decode the RRO signal to extract the data;
an analog front end including an analog to digital converter configured to convert the amplified RRO signal to a digital signal that includes the data;
a processor configured to determine an estimate of a magnitude of the RRO signal based on sample signals extracted from the digital signal, wherein the estimate is an estimate of the magnitude of the RRO signal; and
a gain controller configured to perform operations including:
comparing the estimate of the magnitude of the RRO signal and a specified level to generate an error signal based on a difference between the estimate and the specified level, and
applying the error signal to control a gain of the amplified RRO signal received from the servo wedge.

14. The system of claim 13, further comprising a high pass filter configured to receive the plurality of analog signals from the receiver, to filter the received plurality of analog signals, and to transmit the filtered plurality of analog signals to the amplifier.

15. The system of claim 13, further comprising a continuous time filter configured to receive outputs of the amplifier, filter the outputs, and transmit the filtered outputs to the analog front end.

16. The system of claim 13, further comprising a decoder configured to decode the digital signal to extract the data so that the value established to decode the signal matches an amplitude of the RRO signal.

17. The system of claim 16, further comprising a finite impulse response filter configured to receive digital signals from the analog to digital converter, filter the digital signals, and transmit the filtered digital signals to the decoder.

18. The system of claim 13, wherein the plurality of analog signals include a corresponding plurality of main servo signals, wherein:
- the receiver is further configured to receive a main servo signal with the RRO signal;
- the amplifier is further configured to amplify the main servo signal;
- the analog front end is further configured to convert the amplified main servo signal into a digital main servo signal; and
- the gain controller is further configured to:
  - compare a magnitude of the digital main servo signal to a specified main servo level; and
  - control the amplifier to amplify the main servo signal to the specified main servo level.

19. The system of claim 18, further comprising a gain selection unit configured to perform operations including:
- determining a main servo error signal representing a difference between the magnitude of the digital main servo signal and the specified main servo level;
- receive the error signal based on a difference between the estimate and the specified level;
- determine that a portion of an analog signal being amplified by the amplifier is the RRO signal; and
- in response to the determining, providing the error signal to the processor to apply the error signal to control the gain of the amplified RRO signal.

20. The system of claim 19, wherein, upon the gain selection unit determining that a portion of the analog signal being amplified is the main servo signal, the gain selection unit provides the main servo error signal to the amplifier.

* * * * *